No. 735,020. PATENTED JULY 28, 1903.
R. SHEDENHELM.
FLEXIBLE POWER TRANSMITTING SHAFT.
APPLICATION FILED NOV. 18, 1901.
NO MODEL.
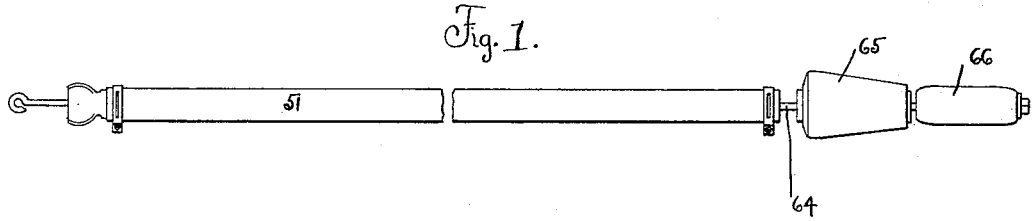
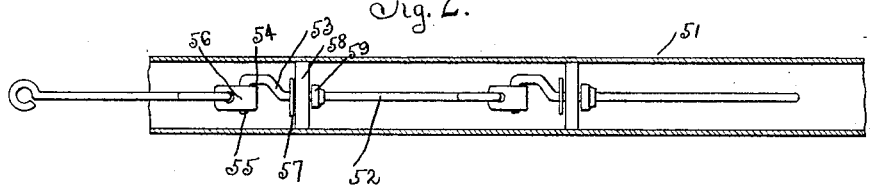
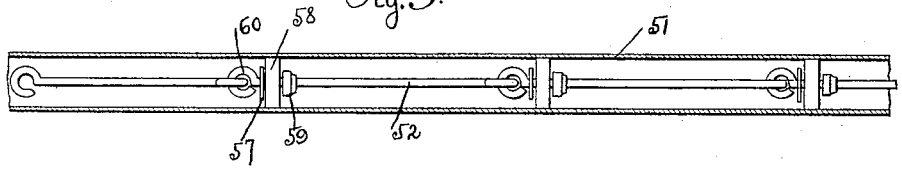
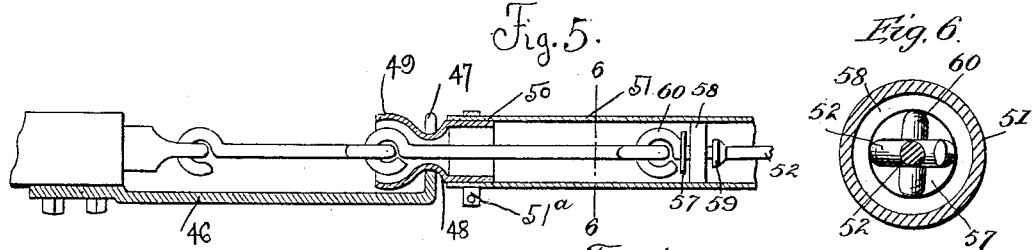
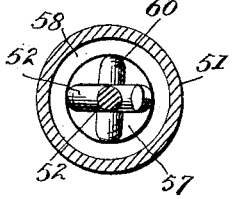
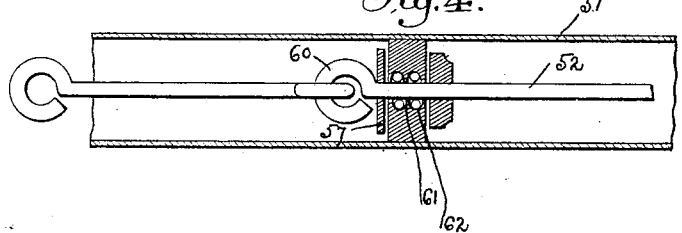
Witnesses:
Charles E. Corbett
Henry Manger
Inventor - Robert Shedenhelm
by Orwig Kane Attys.

No. 735,020. Patented July 28, 1903.

UNITED STATES PATENT OFFICE.

ROBERT SHEDENHELM, OF DES MOINES, IOWA.

FLEXIBLE POWER-TRANSMITTING SHAFT.

SPECIFICATION forming part of Letters Patent No. 735,020, dated July 28, 1903.

Application filed November 18, 1901. Serial No. 82,638. (No model.)

*To all whom it may concern:*

Be it known that I, ROBERT SHEDENHELM, a citizen of the United States, residing at Des Moines, in the county of Polk and State of Iowa, have invented certain new and useful Improvements in Flexible Power-Transmitting Shafts, of which the following is a specification.

My object is to provide an improved flexible power-transmitting shaft designed to be connected with the shaft of a grinding-machine, whereby a rotary movement may be transmitted from the shaft of the grinding-machine to the emery-wheel at the end of the flexible shaft for convenience in grinding articles—such as, for instance, disk cultivators, plows, and the like—which cannot be readily held in a clamping device; and in this connection it is my object, further, to provide a flexible shaft composed of a series of links coupled together in such manner that the rotary movement imparted to one link will be transmitted to the adjacent links when the links are in alinement with each other or at any obtuse angle relative to each other; and, further, in this connection it is my object to provide improved means for supporting the flexible shaft within a flexible hose, by which the shaft is protected and the links prevented from assuming an acute angle relative to each other; and, further, to provide means whereby the joints in the links of the flexible shaft are prevented from coming into contact with the flexible hose.

A further object is to provide an improved ball-bearing roller for devices of this class.

My invention consists in certain details in the construction, arrangement, and combination of the various parts of the device whereby the objects contemplated are attained, as hereinafter more fully set forth, pointed out in my claims, and illustrated in the accompanying drawings, in which—

Figure 1 shows a plan view of the flexible power-transmitter with the emery-wheel and handle attached thereto. Fig. 2 shows an enlarged longitudinal sectional view through a portion of my preferred form of power-transmitting shaft. Fig. 3 shows a like view of a modification. Fig. 4 shows a like view of another modification, and Fig. 5 shows an enlarged detail longitudinal sectional view of the device at one end of the flexible shaft for connecting it with a rotary shaft. Fig. 6 shows a transverse sectional view through the form of flexible shaft shown in Fig. 3.

The reference-numeral 46 indicates an arm fixed to a stationary support and having an upwardly-projecting forked end 47.

The reference-numeral 48 indicates a round tubular neck admitted into the forked end 47. At one end of the neck 48 is a hollow head 49, and on its other end is a cylindrical body portion 50.

The numeral 51 indicates a flexible hose held to the body portion 50 by means of the clamp 51ª.

Referring to Fig. 2 of the accompanying drawings, it will be seen that my preferred form of flexible shaft comprises a series of links, each of which is composed of a straight round rod or body portion 52. Near each end portion the rod is bent laterally at 53, then parallel with the body portion at 54, and its end is bent at right angles to the body portion at 55. The other end of the link is of the same general shape and the part 55 of one end stands at right angles to the part 55 at the other end. The reference-numeral 56 indicates a block having the adjacent ends of two links passed through it in directions at right angles to each other, and the extreme ends of the rods are upset to firmly retain the blocks in their position and yet to permit the ends 55 to rotate freely in the block. Near one end of each link 52 is a washer 57, and adjacent to the washer is a roller 58, and on the other side of the roller opposite from the washer is a rounded collar 59, the said washer and collar being connected with the link 52 to prevent longitudinal movements of the roller. These rollers are of a size and shape to accurately fit the interior of the hose 51, and obviously they will remain stationary while the flexible shaft rotates within them. They serve the function, however, of centering the flexible shaft within the flexible hose, and they are placed near one end of the link instead of at the central portion of the link, so that when the flexible shaft is curved the inner links will not engage the flexible hose. Obviously there can be no sharp bend in the flexible hose at the point where the rollers stand and any sharp bend in the hose would have to be at some other point. Obviously if the rollers were placed at the central portions of the links a sharp bend in the flexible hose would come immediately at the joints in the flexible shaft. Hence placing the rollers at the end portions of the links prevents their assuming a position where any of the links will stand at an acute angle relative to each other and sharp bends or kinks in the hose are prevented.

In the modified form shown in Fig. 3 I have dispensed with the block 56, and I have formed in the end of each link a loop 60, the loops on the opposite end of each link being at right angles to each other, the center of each loop being in line with the shaft.

In the modified form shown in Fig. 4 the links of the flexible chain are similar to those shown in Fig. 3. However, the rollers are each provided with two annular grooves 61, surrounding the central opening of the roller, and these grooves are filled with bearing-balls 62, and obviously after the shaft is passed through the opening between the bearing-balls a double-ball bearing is formed, inasmuch as the shaft holds the balls in position.

At the end of the flexible shaft opposite from the end attached to the shaft 17 I have placed a solid shaft 64, and detachably fixed to this shaft 64 is an emery-wheel 65 of truncated shape, and on the same shaft 64 I have mounted a rotatable handle 66, also detachable. By this means the flexible shaft may be made to drive the emery-wheel 65, and articles—such, for instance, as disk cultivators, plows, &c.—may be ground conveniently and quickly, no matter in what position they may be placed. Furthermore, the handle 66 and the emery-wheel 65 may be detached and the position of the emery-wheel and handle reversed on the shaft 64, so that the large end of the emery-wheel will be at the outer end of the shaft 64, whereby it may be used in polishing or grinding comparatively flat surfaces.

Having thus described my invention, what I claim, and desire to secure by Letters Patent of the United States therefor, is—

1. An improved flexible, power-transmitting shaft, composing in combination, a series of links each composed of a straight rod with their body portions in line with each other, and their ends pivotally connected, a collar fixed to each rod, near one end, a roller rotatably mounted on each rod between the collar and the adjacent end of the rod and a flexible hose encircling the links and engaged by the rollers, for the purposes stated.

2. An improved flexible shaft comprising in combination a series of links, each link comprising a straight round body portion 52, a part 55 at each end arranged at right angles to the body portion, a block between each pair of links having openings therein at right angles to each other to receive the ends 55, said blocks being fitted to the ends 55 in such manner that the body portions of the links will be in alinement, substantially as and for the purposes stated.

3. An improved flexible shaft comprising in combination a series of links, each link comprising a straight round body portion 52, a part 55 at each end arranged at right angles to the body portion, a block between each pair of links having openings therein at right angles to each other to receive the ends 55, said blocks being fitted to the ends 55 in such manner that the body portions of the links will be in alinement, a roller rotatably mounted near one end of each link, and a flexible tube or hose to receive the flexible shaft and to be engaged on its interior by said rollers for the purposes stated.

4. In a device of the class described, the combination of a flexible tube or hose, a collar fixed to one end of the tube or hose and having a narrow neck and an enlarged hemispherical head projected beyond the tube or hose, a link passed through the narrow neck and projected into the tube or hose, a second link coupled to the first within the hemispherical head and a forked, stationary support to admit the narrow neck.

ROBERT SHEDENHELM.

Witnesses:
C. E. CORBETT,
J. RALPH ORWIG.